United States Patent
Yousaf et al.

(10) Patent No.: US 11,042,417 B2
(45) Date of Patent: Jun. 22, 2021

(54) METHOD FOR MANAGING COMPUTATIONAL RESOURCES OF A DATA CENTER USING A SINGLE PERFORMANCE METRIC FOR MANAGEMENT DECISIONS

(71) Applicant: NEC Laboratories Europe GmbH, Heidelberg (DE)

(72) Inventors: Faqir Zarrar Yousaf, Leimen (DE); Luis Moreira-Matias, Hamburg (DE); Xavier Costa Perez, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/323,780

(22) PCT Filed: Aug. 10, 2016

(86) PCT No.: PCT/EP2016/069075
§ 371 (c)(1),
(2) Date: Feb. 7, 2019

(87) PCT Pub. No.: WO2018/028781
PCT Pub. Date: Feb. 15, 2018

(65) Prior Publication Data
US 2019/0171492 A1 Jun. 6, 2019

(51) Int. Cl.
*G06F 15/173* (2006.01)
*G06F 9/50* (2006.01)
(Continued)

(52) U.S. Cl.
CPC ........ *G06F 9/5077* (2013.01); *G06F 9/45558* (2013.01); *G06F 9/5061* (2013.01);
(Continued)

(58) Field of Classification Search
CPC .... G06F 9/5077; G06F 9/5061; G06F 9/5072; G06F 9/542; G06F 9/45558;
(Continued)

(56) References Cited

U.S. PATENT DOCUMENTS 8,260,893 B1 * 9/2012 Bandhole .............. G06F 9/5083
709/221
9,300,728 B1 3/2016 Ananchaperumal
(Continued)

FOREIGN PATENT DOCUMENTS

EP 3040860 A1 7/2016
GB 2507170 A 4/2014

OTHER PUBLICATIONS

Pinheiro E et al: "Load Balancing and Unbalancing for Power and Performance in Cluster-Based Systems", Internet Citation, May 2001 (May 2001), XP002261813.

*Primary Examiner* — Johnny B Aguiar
(74) *Attorney, Agent, or Firm* — Leydig, Voit & Mayer, Ltd.

(57) ABSTRACT

A method for managing computational resources of a data center is useable for making one or more management decisions (MD). One or more computational resources of the data center are assigned to one or more physical and/or virtual functions by MD of a decision making entity (DME). The MD are based on collected performance information of the one or more computational resources. The collected performance information is analysed considering one or more predefined performance parameters. A single performance metric (SPM) is computed representing performance and efficiency of the DME using a result of the analysis. The SPM is used by the DME for making the MD.

18 Claims, 7 Drawing Sheets

(51) Int. Cl.
    *G06F 9/54* (2006.01)
    *G06F 9/455* (2018.01)
(52) U.S. Cl.
    CPC ............ *G06F 9/5072* (2013.01); *G06F 9/542* (2013.01); *G06F 2009/45583* (2013.01); *G06F 2209/501* (2013.01); *G06F 2209/505* (2013.01); *G06F 2209/508* (2013.01)
(58) Field of Classification Search
    CPC ..... G06F 2009/45583; G06F 2209/501; G06F 2209/505; G06F 2209/508
    USPC .......................... 709/223, 224, 226; 718/104
    See application file for complete search history.

(56) References Cited

U.S. PATENT DOCUMENTS

| | | | |
|---|---|---|---|
| 2010/0083145 A1* | 4/2010 | Schang | H04L 41/5025 715/760 |
| 2013/0132561 A1* | 5/2013 | Pasala | H04L 67/1097 709/224 |
| 2014/0047438 A1 | 2/2014 | Da Silva et al. | |
| 2014/0282591 A1* | 9/2014 | Stich | G06F 9/5061 718/104 |
| 2015/0039764 A1* | 2/2015 | Beloglazov | H04L 47/70 709/226 |
| 2016/0094401 A1 | 3/2016 | Anwar et al. | |
| 2016/0182345 A1* | 6/2016 | Herdrich | H04L 41/5025 709/224 |

* cited by examiner

METHOD FOR MANAGING COMPUTATIONAL RESOURCES OF A DATA CENTER USING A SINGLE PERFORMANCE METRIC FOR MANAGEMENT DECISIONS

CROSS-REFERENCE TO PRIOR APPLICATION

This application is a U.S. National Stage Application under 35 U.S.C. § 371 of International Application No. PCT/EP2016/069075 filed on Aug. 10, 2016. The International Application was published in English on Feb. 15, 2018, as WO 2018/028781 A1 under PCT Article 21(2).

FIELD

The present invention relates to a method for managing computational resources of a data center, wherein said one or more computational resources of said data center are assigned to one or more physical and/or virtual functions by management decisions, 'MD', of a decision making entity, 'DME'.

The present invention further relates to a data center comprising one or more managing entities and a decision making entity, 'DME', said managing entities being adapted to assign one or more computational resources of said data center to one or more physical and/or virtual functions by management decisions, 'MD', of said DME.

The present invention even further relates to a computing entity, adapted to make management decisions, 'MD' for assigning one or more computational resources of a data center to one or more virtual functions.

Even further the present invention relates to a non-transitory computer readable medium storing a program causing a computer to execute a method for managing computational resources of a data center, wherein said one or more computational resources of said data center are assigned to one or more virtual functions by management decisions, 'MD', of a decision making entity, 'DME'.

Although applicable in general to any kind of data centers, the present invention will be described with regard to data centers providing cloud based services.

Although applicable in general to any kind of decision making entity, the present invention will be described with regard to a cloud management system CMS for management and orchestration of physical resources such as compute, network, storage, etc. as well as virtual resources such as hypervisor, virtual machine, vCPU, cNIC, vMemory, vLinks, etc.

Although applicable to any virtual and/or physical computational resource, the present invention will be described with regard to virtual computational resources.

Although applicable to any virtual and/or physical function, the present invention will be described with regard to virtual functions.

BACKGROUND

Data Centers, 'DC' providing cloud based services conventionally use a Cloud Management System, 'CMS' for the management and orchestration of its physical resources such as compute, network, storage etc. as well as the virtual resources, such as Hypervisor 'HV', Virtual Machine 'VM', vCPU, vNIC, vMemory, vLinks etc. FIG. 1 shows a conceptual, high-level overview of a conventional cloud based system where several Virtual Functions, 'VF' are deployed and instantiated over a virtualized infrastructure i.e., a DC. A VF is a well-defined entity with specific functional characteristics. A complex VF may be decomposed into several VF components 'VFC' interconnected together in a specific order via well-defined interfaces to provide the overall function. Several VFs in turn may be interconnected in a specific order to provide a complete Cloud Service 'CS' that is eventually connected to some external functional entity. A DC may host multitude of VFs and, by extension, CSs. Each VF is allocated a specific quota of resources depending on the operational/service requirements/constraints of the VF specified in a VF descriptor.

These physical/virtual resources of the data center are being consumed by the individual VFs and hence the network services 'NS'. During the lifetime of a service, the resource requirements may change owing to varying workload conditions, and the CMS thus has to take appropriate decisions on management actions requiring orchestration of resources between VF instances in order to maintain the overall service integrity while ensuring efficient utilization of the DC resources including power consumption. The management actions, also referred to as Lifecycle Management 'LCM' actions, are applied on VFs that may also require orchestration of various resource entities. Some of the LCM actions such as VF deployment, instantiation, and configuration are executed at the time of service initialization. Thereafter LCM actions on VF instance(s) such as scale-up/down/in/out, migration, placement, upgrade/update etc. are executed at run-time thereby entailing the CMS to render efficient management and orchestration methods.

However, to provide effective management and orchestration actions, the CMS has to monitor a multitude of metrics related to the utilization of a plurality of resources (both physical and virtual) for each VF instance and process them to derive performance metrics, which are then analyzed by comparing them to the stipulated service performance benchmarks in order to ensure that the service requirements are being fulfilled and remain within the stipulated service performance bounds/thresholds. This incurs a steady load on the CMS in terms of the amount of data being monitored, processed and then analyzed. This problem scales up as the size of the DC increases and/or the number of concurrent cloud services hosted in a DC increases.

In detail, e.g. whenever the CMS senses or receives an event notification that may indicate that the service integrity may be compromised or on the verge of being compromised, whether due to insufficient resources owing to increased service demand, i.e., load and/or due to the impact of other VF instance(s) hogging resources and/or due to failure of one or more resource unit(s), the CMS will execute appropriate LCM actions in order to ensure and maintain the end-to-end service integrity. The decision by the CMS to derive a management action that is most appropriate to the specific event is complex where the CMS may have to take into consideration multiple factors before deciding on a suitable action and executing it. Conventionally the CMS may have one or more algorithms for deriving LCM action and orchestrating resources appropriately and efficiently. The choice of which algorithm to deploy is also a complex task as it may be that some algorithms may out-perform others for specific events under certain conditions, while they may prove ineffective under different conditions. Thus the CMS may have to make several decision rounds before the service becomes stable. Each time a management action is executed, for example VF migration or scaling, it will impact the QoS of the NS that the VF is part of.

SUMMARY

In an embodiment, the present invention provides a method for managing computational resources of a data center which is useable for making one or more management decisions (MD). One or more computational resources of the data center are assigned to one or more physical and/or virtual functions by MD of a decision making entity (DME). The MD are based on collected performance information of the one or more computational resources. The collected performance information is analysed considering one or more predefined performance parameters. A single performance metric (SPM) is computed representing performance and efficiency of the DME using a result of the analysis. The SPM is used by the DME for making the MD.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
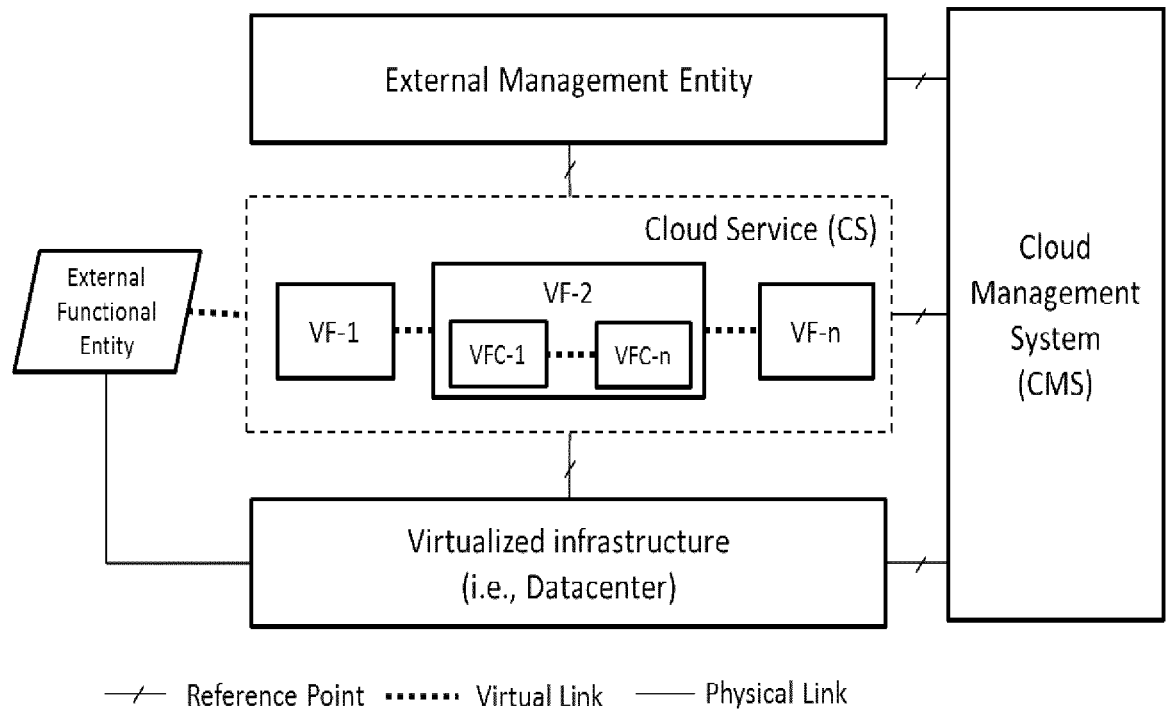
FIG. 1 shows a conventional cloud based service infrastructure.

One of the problems addressed by embodiments of the present invention is to enhance the CMS quality of decision, 'QoD', thereby enabling to select the best possible method and/or action(s) in order to derive the most suitable management decision.

One of the further problems addressed by embodiments of the present invention is to provide fewer iterations and fewer resources consumed while minimizing the monitoring and processing load.

One of the further problems addressed by embodiments of the present invention is to enable fast decisions which can be made in an easy way.

In an embodiment the present invention provides a method for computational resources of a data center wherein said one or more computational resources of said data center are assigned to one or more physical and/or virtual functions by management decisions, 'MD', of a decision making entity, 'DME', and wherein said MD are based on collected performance information of said computational resources said collected performance information being analysed considering predefined performance parameters, and wherein a single performance metric, 'SPM', is computed representing the performance and efficiency of said DME using a result of said analysis and wherein said SPM is used by said DME for making MD.

In a further embodiment the present invention provides a data center comprising one or more managing entities and a decision making entity, 'DME', said managing entities being adapted to assign one or more computational resources of said data center to one or more physical and/or virtual functions by management decisions, 'MD', of said DME, said MD being based on collected performance information of said resources said collected performance information being analysed considering one or more predefined performance parameters, and wherein a single performance metric, 'SPM', is computed representing the performance and efficiency of said DME using a result of said analysis and wherein said DME is adapted to use said SPM for making MD.

In a further embodiment the present invention provides a computing entity, adapted to make management decisions, 'MD' for assigning one or more computational resources of a data center to one or more physical and/or virtual functions, said MD being based on collected performance information of said computational resources being analysed considering one or more predefined performance parameters, and to use a single performance metric, 'SPM', representing the performance and efficiency of said computing entity using a result of said analysis to make MD.

In a further embodiment the present invention provides a non-transitory computer readable medium storing a program causing a computer to execute a method for managing computational resources of a data center, wherein said one or more computational resources of said data center are assigned to one or more physical and/or virtual functions by management decisions, 'MD', of a decisions making entity, 'DME', and wherein said MD are based on collected performance information of said computational resources, said computational resources being analysed considering one or more predefined performance parameters, and wherein a single performance metric, 'SPM', is computed representing the performance and efficiency of said DME using a result of said analysis and wherein said SPM is used by said DME for making MD.

In other words the present invention provides a single metric by means of which the very performance of the decision making entity like a CMS or the like can be measured and/or quantified in terms of the quality of the management decision, for example LCM decision.

The terms "computing entity" and "computing device" refer in particular in the claims, preferably in the specification each to a device adapted to perform computing like a personal computer, a tablet, a mobile phone, a server, or the like and comprises one or more processors having one or more cores and may be connectable to a memory for storing one or more applications which is/are adapted to perform corresponding steps of one or more of the embodiments of the present invention. Any application may be software-based and/or hardware-based installed in the memory on which the processor(s) can work on. The devices, entities or the like may be adapted in such a way that the corresponding steps to be computed are performed in an optimized way. For instance different steps may be performed in parallel with a single processor on different of its cores. Further the entity/device may be identical forming a single computing device. The device(s)/entity(ies) may also be instantiated as a virtual device running on a physical computing resource. Different devices/entities may therefore be executed on said physical computing resource.

The term "data center" is to be understood in its broadest sense and refers in particular in the claims, preferably in the specification to one or more computation devices connected together providing one or more services, applications, etc. for other applications, users, etc. that may be physical and/or virtual. The data center may include, but not limited to, computes, networks, memories and/or storages.

The term "computational resource" is to be understood in its broadest sense and refers in particular in the claims, preferably in the specification to any kind of physical and/or virtual computational or compute resource, resource, device, entity or the like adapted to perform computing and which can be used by applications, services, users, etc. to perform certain functions, services, applications or the like. A computational resource may include but is not limited to computes, networks, memories, storages, etc. For instance a compute resource may be a CPU resource that is part of the servers inside the datacenter. Thus a server can have Compute like CPU (or vCPU), Network like Network Interface card (NIC), Memory like RAM and/or Storage like external/internal HDD(s).

The term "performance parameter" is to be understood in its broadest sense and refers in particular in the claims, preferably in the specification to any kind of information, data, parameter, variable or the like, which represents in any kind the performance and/or utilization of a computational resource, for example processing load, power consumption, etc. For example the term "KPI"—key performance indicator—can be seen as performance parameter.

The term "performance metric" is to be understood in its broadest sense and refers in particular in the claims, preferably in the specification to any kind of single variable representing a defined performance of a device, entity, or the like taking into account multiple, different performance parameters.

The term "virtual function" is to be understood in its broadest sense and refers in particular in the claims, preferably in the specification to any kind of application, function or the like being defined on a higher abstraction level and using one or more of physical and/or virtual resources for performing the intended virtualized function, application(s), etc.

The term "event" is to be understood in its broadest sense and refers in particular in the claims, preferably in the specification to any kind of incident, occasion, happening, act or the like. The term "event information" represents information, data, etc. encoded into a machine-readable format of an event.

The term "external" with regard to or in connection with the term "event" refers in particular in the claims, preferably in the specification to any kind of an event outside the underlying computational system, device, entity or the like. For instance, an external event may be—but is not limited to—network load like a maximum throughput between a time frame of 12:00 and 14:00 or the like.

The term "management decision" is to be understood in its broadest sense and refers in particular in the claims, preferably in the specification to any kind of decision, ruling or judgement related to one or more actions to be performed, for instance—but not limited to—(re)assignment of computational resources to other virtual functions.

The term "action" is to be understood in its broadest sense and refers in particular in the claims, preferably in the specification to any kind of act, activity, operation, performance or the like, for instance concrete steps for (re)assignment of computational resources to other virtual functions like allocating memory, freeing allocated memory, increasing or decreasing priority values for a virtual function on a processor or the like.

At least one embodiment of the present invention enables enhancing management decision capabilities and orchestration actions of the decision making entity like a CMS or the like in particular resource- and performance-wise. At least one embodiment of the present invention enables a decreased reliance on continuous monitoring and processing load, both in terms of the amount of data needed to monitor and their respective processing.

Even further at least one embodiment of the present invention may have the advantage of being flexible easy to implement and cost-effective.

At least one embodiment of the present invention may have at least one of the following further advantages:
1. Enables the DME like a CMS to easily select the best possible method and/or decision on management/orchestration action.
2. Enables the DME like a CMS to make optimum management decisions and orchestration actions with less iterations.
3. Reduces the time it takes for the DME like a CMS to make the decision on actions.
4. Reduce the time it will take for the affected services to become stable as fewer management iterations will be required.
5. Reduce the monitoring and processing load on the DME like a CMS e.g. by enabling it to avoid repeated monitoring of individual resource units per VF (or VFC) and then processing it each time to derive a management and orchestration action.

The following abbreviations are inter alia used within the specification and the claims:

| | |
|---|---|
| AE | Analytics Engine |
| CMS | Cloud Management System |
| DME | Decision making entity |
| CS | Cloud Service |
| vNIC | virtualized NIC |
| DC | Data Center |
| DE | Decision Engine |
| EM | Element Manager |
| FM | Fault Management |
| HV | Hypervisor |
| LCM | Lifecycle Management |
| MANO | Management and Orchestration |
| MC | Monitoring Client |
| MD | Management Decision |
| MS | Monitoring Server |
| NFV | Network Function Virtualization |
| NFVI | NFV Infrastructure |
| NFVO | NFV Orchestrator |
| NS | Network Service |
| PM | Performance Management |
| QoD | Quality of Decision |
| QoD-R | QoD Repository |
| QoS | Quality of Service |
| SD | Service Descriptor |
| SLA | Service Level Agreement |
| SPM | Single Performance Metric |
| vCPU | virtualized CPU |
| VF | Virtualized Function |
| VFC | Virtualized Function Component |
| VFD | VF Descriptor |
| VIM | Virtualized Infrastructure Manager |
| VM | Virtual Machine |
| VNF | Virtualized Network Function |
| VNFM | VNF Manager |

Further features, advantages and further embodiments are described or may become apparent in the following:

Said SPM may be computed based on at least one of the following metrics for one or more virtual functions: rate of MD, average resource utilization, wherein said computed SPM can then be weighted by a time-dependent weight function. A plurality of virtual functions may form a virtual function chain. This enables an enhanced effectiveness of MD, when e.g. the resource utilization or the rate of MD is included: The long term validity of the MD and orchestration action are a direct reflection on the stability of the services provided by a data center or in other words, how stable the services became as a result of the application of a specific MD action e.g. on one or more constituent VFs, and the durations that this stable state was maintained before the DME had to act again on the same VF instance(s). The frequency of the DME to make MD is referred to as the "decision rate" of the DME, i.e., the number of MD (either same or different) that a DME has to make per unit time on the same VF instance(s), and by extension service instance(s), in order to ensure stable service(s). The lower the decision rate the higher the quality of decision QoD of the DME.

Further the amount of resources, either physical or virtual, that is allocated to VF instance(s) and consumed by it as part of the LMD action. Thus the QoD value for the DME will be high if the MD decision/action results in relatively lesser aggregate allocation/consumption of resources; either individual resources or aggregated resources. This can also take into account the amount of resources consumed by the DME itself as part of its management decision functions.

Said SPM in form of the QoD may be computed as:

$$QoD = w(t) \cdot \left[1 - \frac{\theta \cdot \mu + \sigma^2}{2}\right] \in [0, 1]$$

where
$\theta$=decision rate, $\mu$=average resource utilization, $\sigma$=standard deviation and
w(t)=time-dependent weight function.

The DME may be entailed to compute the QoD value for each LCM decision, as well as the resulting resource orchestration that it derives for one or more VFs which will in turn belong to one or more services for instance.

MD may be made upon receiving of one or more notifications of events which may be provided by external management system and/or provided by observations of one or more computing entities of said data center. In other words a CMS for instance as DME will take decision(s) on action(s) based on event notification(s) that it will receive from one or more functional entities that are part of the data center or the CMS framework. The event notification(s) can also be received by the CMS from external entities that fall within the CMS' administrative domain or domains with which the CMS has trust relationship, such as a VF itself or its constituent components, i.e. VF component (VFC), or it may be from the underlying virtualized infrastructure management (VIM) entity that is managing the virtualized resources for the CS/VF or by an external management system e.g., OSS/BSS. Besides reacting to event notifications, the CMS can also take actions based on its own observation of the various data items that it is monitoring.

Said SPM may be evaluated and may be updated periodically irrespective of whether at least one MD has been made or not. Said SPM may also be evaluated and may be updated periodically when at least one MD has to be made or is made. When said SPM, e.g. in form of the QoD takes into consideration the decision rate, the QoD value may be evaluated and updated at regular time intervals ($t_{eval}$), e.g. depending on whether the DME takes any action or not within a specified time unit (i.e., $t_{eval}$) This enhances the flexibility while providing fast (re)actions to changing conditions of the utilization of computational resources for example.

For each MD to be made or set of MD to be made, an SPM may be computed, wherein said MD or set of MD to be made is obtained by at least two different algorithms and wherein said MD or said set of MD is chosen for execution having the highest SPM of said at least two computed SPMs by at least two different algorithms. For instance an algorithm may be a decision algorithm, for example, decision on scheduling algorithm or heuristics. This enables in an easy way for the DME to determine the most effective and efficient MD or set of MD.

Said SPM and the corresponding MD are stored in the storage entity and wherein when an event occurs said stored MD and associated SPM are checked whether said stored MD can be executed in view of the occurred event. For instance the advantage of evaluating and assigning a QoD value to an DME decision on actions is that next time the DME is faced with a similar situation or experiences a certain event, it will look up the storage entity for the same event listing, look up the QoD value corresponding to the event, and if the QoD value is "reasonably high" it will look up what actions it took and/or which method or algorithm, or the like it utilized for making the past decision on action(s). In case the QoD value corresponding to the specific event is below a certain reasonable value then the DME can make alternate management decision and avoid executing the previous decision and/or method. This by itself will enable the DME to eliminate decisions that in the past did not yield feasible results.

Thus maintaining a SPM in a storage entity and referring to this single value in the case of an event will:
1. Reduce the time it takes for the DME to make the decision on actions.
2. Reduce the time it will take for the affected services to become stable as fewer management iterations will be required.
3. Enable the DME to select the best possible method and/or decision on management/orchestration action.
4. Enable the DME to make optimum or near optimal management decisions and orchestration actions with less number of decision iterations.
5. Reduce the monitoring and processing load on the DME by e.g. enabling it to avoid the repeated monitoring of individual resource units per VF (or VFC) and then processing it each time to derive a management and orchestration action.
6. Enable the services to stabilize quickly with optimum service and resource utilization.

Said stored SPM and corresponding MD may be stored in a multi-map based data structure. For example a first key (i.e., Key-1) identifies the specific event using the parameter event_code. A second key (i.e., Key-2) is vf_pointer, which is a list of pointers indicating VF instance(s) that experienced similar event/issues and were managed by the DME. Table 1 below provides a non-exhaustive list of some values associated with the key pair and their respective description. Table 1 is an example for a virtual function instance.

The present invention and its embodiments can also be used for physical resources and functions, where Table 1 would represent the physical functional instances which will be identified by relevant identifiers and descriptors.

| Key-1 | Key-2 | Value 1 | Value 2 | Value Description |
|---|---|---|---|---|
| event_code | vf_pointer | event_source | — | The source producing the event notification towards the CMS. It can be any entity within the CMS administrative domain. |
| | | vf_id | vfd | The descriptor file describing the type and the functional and operational attributes, including resource requirements of the target VF. |
| | | | vfc_id | The identifier of an affected VF component that needs to be managed by the CMS. A list can be used to identify multiple VFCs of a VF that may need to be managed. For standalone VFs, this value is NULL. |
| | | | cs_id | Identifies the cloud service (CS) that the VF is part of In case the CS is composed of a single VF then its value will be the same as vf_id. In case the CS is composed of multiple VFs, then this points to the list of constituent VF ids. |
| | | | action_code | Indicate the decision on LCM action and resource orchestration that the CMS took on the target VF(C). |
| | | | method_id | Identifies the method/logic (algorithm) adopted by the CMS for deriving the action_code. A CMS may embody multiple types of method. |
| | | | qod_val | The QoD value that is assigned by the CMS indicating the effectiveness of the management decision it took for the specific event. This value is regularly evaluated and updated. |
| | | | resource_profile | The resource profile being derived for the respective VF or CS. |

Storing said SPM and corresponding MD in a multi-map based data structure enables an easy implementation of storage of SPM and provides a fast access to information for the DME to make an effective MD.

Said SPM and corresponding MD may be computed event-based, wherein said SPM and corresponding MD are stored together with event information. This enables to compute and if applicable store event-based SPM, such that for instance in case of a high memory usage above a threshold—the event here—the SPM associated with said event and the corresponding MD are chosen to mitigate said high memory usage.

Computational resources of said data center monitor information comprising at least one of: performance information of itself, an occurring event on said computational resource and wherein said monitored information is transmitted to an analysing entity, which upon analysis transmits an analysis result to DME for making MD. Said computational resources may either be physical or virtual or a combination of both. This further reduces the processing and monitoring load on a DME. In other words the monitoring is done in a distributed manner rather than by a centralized single entity. This can be achieved by enabling a monitoring client, as analysing entity, in each host system monitoring and analyzing the utilization of both physical and virtual resources at the host level.

Said SPM may be decreased or increased in predefined steps after the expiry of a certain time period ($t_{eval}$). Said increasing or decreasing may be performed each time after expiry of said certain time period or after expiry of a plurality of time periods and/or upon request. This enables a fast and efficient while still precise computation of an SPM, whereas the computation of SPM may be weighted by a time-dependent weight function.

The size of the steps may be time-dependent and may be adapted based on the time for computing said SPM. This enhances the flexibility and may enable an easy adaption to current situations of the data center.

Said SPM is increased when no MD have been made during said certain time period and wherein said SPm is decreased when one or more MD have been made during said certain time period. This enables to reward a stable situation within the data center, i.e. the DME does not have to make MDs.

The information stored on the storage entity may be shared between a plurality of different physical and/or virtual instantiated resources of said data center. For example external entities like Operations Support System (OSS)/Business Support System (BSS) can use the information stored on the storage entity for recommendations or management decisions. This enhances further the efficiency and flexibility.

FIG. 1 shows a conventional cloud based service infrastructure.

In FIG. 1 a conceptual high level overview of a conventional cloud-based system is shown. The underlying system of FIG. 1 was already described above in the introduction.

Figure 2:
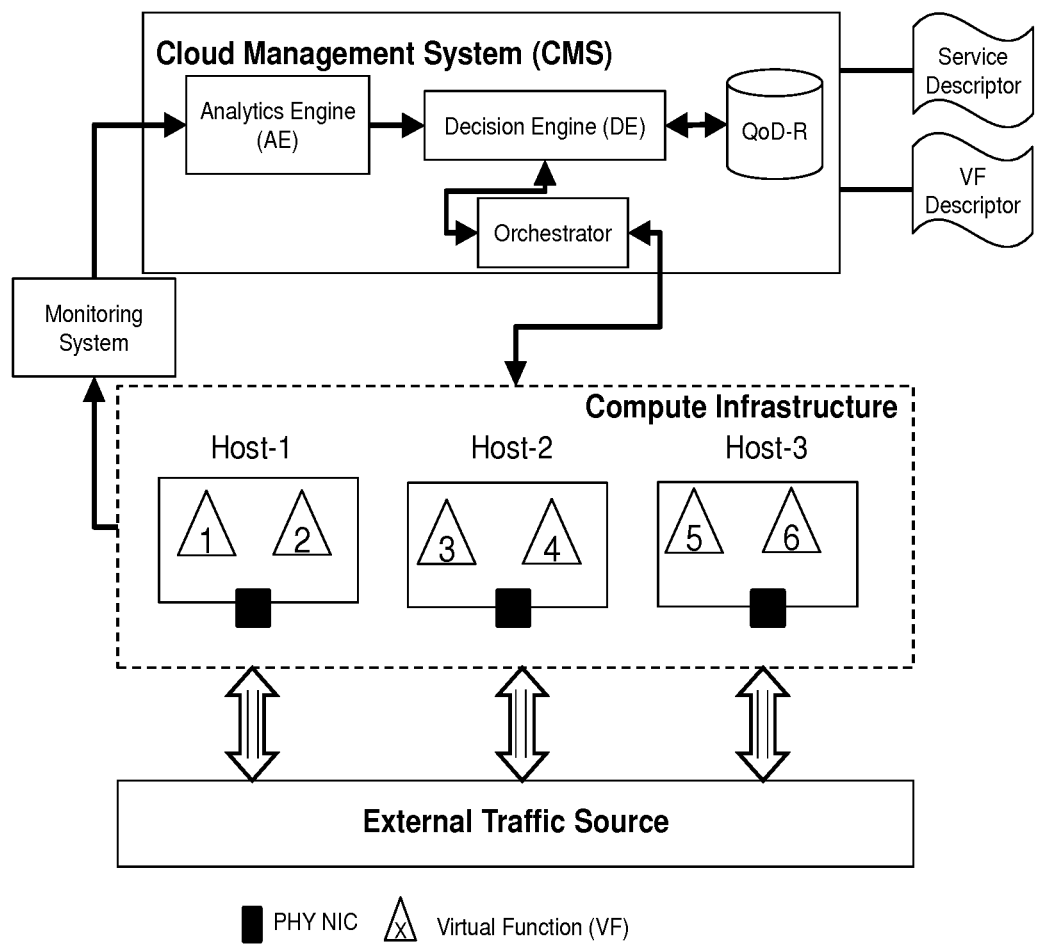
FIG. 2 shows a system according to an embodiment of the present invention.

FIG. 2 shows a system according to an embodiment of the present invention.

In FIG. 2 an exemplary use case scenario is shown: FIG. 2 illustrates an exemplary setup consisting of 3 host systems having 2 VFs each. Traffic load from external source is being handled by the VFs as per their service scope. Each VF consumes portion of the resources such as compute, network, storage, memory etc. that has already been allocated at the time of their deployment and instantiation. A CMS is managing the VF in all 3 hosts and periodically or continuously monitoring the utilization of the resource units, i.e., compute, network, memory, storage etc. for each VF and host within the DC. The monitoring is being done by an underlying Monitoring System that is continuously providing its inputs on various resource attributes to the Analytics Engine AE within the CMS. The AE will derive key performance indicators KPIs from the information provided by the monitoring system for each VF and host, and compare the conformance of the CS quality based on the information within the Service Descriptor SD repository. The SD repository provides the service profile by maintaining meta-information about the service performance requirements, service configuration requirements, constituent VFs and other service-related meta-data. The AE will provide a notification to the Decision Engine DE each time it observes the non-conformance of one or more service KPIs. The AE can also indicate the VF(s) that is the cause of the performance bottleneck as it has access to VF Descriptor VFD repository. The VFD repository comprises performance, configuration and resource requirements for a VF besides other meta-data. The DE upon receiving the notification from the AE will invoke a suitable method or algorithm to arrive at the best management decision MD to resolve the performance issue. The DE will then inform its decision to the Orchestrator that will perform the necessary low-level tasks at the resource level to invoke and enforce the DE's decision. The orchestrator will inform the DE whether the decision execution was successful or not. In the latter case, the DE will re-evaluate with an alternate decision. It should be noted that both the AE and DE have access to SD and VFD repository.

With reference to FIG. 2 at some point in time for instance, the AE observes or is notified that the traffic load on VF1 in Host-1 (i.e., the target-VF) has crossed a specified KPI threshold and its allocated network resources will soon be exhausted to handle this increased workload situation. The Decision Engine (DE) is notified of this situation, which then has to derive an appropriate decision on LCM actions on the target-VF to ensure that its service integrity is maintained as per the SLA in the SD/VFD repository. The DE will then indicate its decision to the Orchestrator that will execute necessary actions to fulfil the management decision. Assume that the DE has two decision algorithms namely Algorithm-1 and Algorithm-2, and one of them will be utilized to make decision on action and resource orchestration. Based on the inputs from the AE, assume that Algorithm-1 at a specific point in time decides to migrate the target-VF to the candidate Host-2 due to lower aggregate load on it than Host-3 (see FIG. 3). However, the aggregate load on Host-2 will continue to increase till it finds its network resources insufficient to handle the workload requirements of the newly migrated target-VF. Recognizing this situation, Algorithm-1 is utilized again by the DE and this time it chooses to migrate the target-VF to candidate Host-3. This is because at the time of making decision the aggregate load on Host-3 is lower than Host-2 and has the requisite network resources available, shown in FIG. 3.

Figure 3:
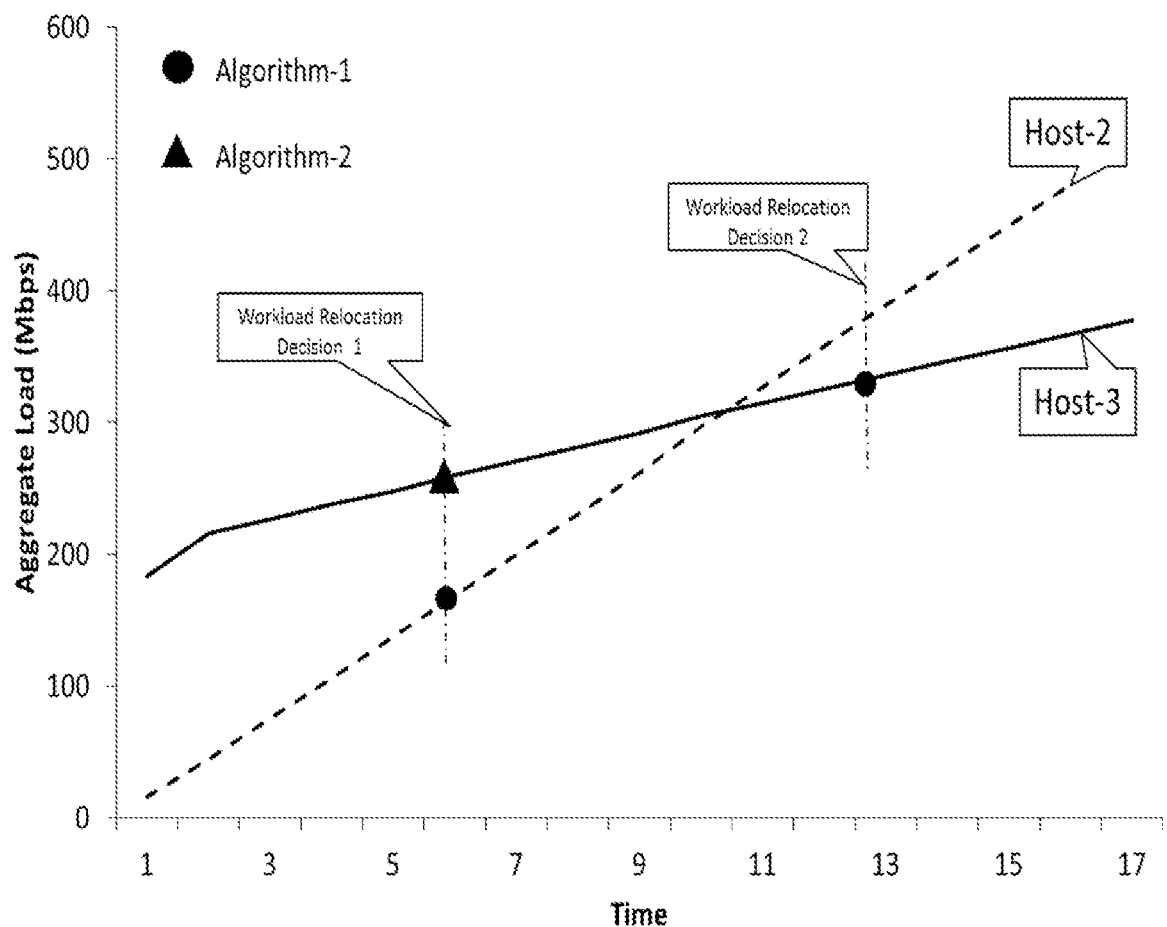
FIG. 3 shows part of steps of a method according to a further embodiment of the present invention.

FIG. 3 shows part of steps of a method according to a further embodiment of the present invention.

In FIG. 3 the aggregated load profiles of candidate Host-2 and Host-3 and the performance of the first and second algorithm, Algorithm-1 and Algorithm-2 is shown. As it can be seen from FIG. 3 eventually Host-3 proves to be a better choice for long-term performance stability of target-VF. Algorithm-1 is thus executed twice to find the optimum solution and each time it is executed the QoD value is degraded.

Now it is assumed that in contrast to Algorithm-1, Algorithm-2 is able to foresee the long-term trends of the overall aggregate data rates and, during its very first decision round, would select Host-3 as the most suitable host to migrate the target-VF to. Thus in the same time-span when Algorithm-1 takes two decision rounds to select the most suitable host for the target-VF, Algorithm-1 takes a single round of decision to make the optimum decision and hence the QoD of Algorithm-2 will be evaluated higher than Algorithm-1. This is also illustrated in FIG. 3 that shows the performance of Algorithm-1 and Algorithm-2 in view of rising aggregate load in Host-2 and Host-3 over time. Having evaluated and rated the QoD of Algorithm-2 higher than Algorithm-1, the CMS when confronted next time with a similar performance scenario will utilize Algorithm-2 for making the decision on action.

In another situation, it could be that Algorithm-1 may prove to have better congestion management capabilities than error handling capabilities. Thus the QoD of Algorithm-1 will be evaluated higher when utilized to make management decisions on VF(s) whose services may be experiencing congestion. On the other hand the QoD of the same Algorithm-1 will be evaluated low when utilized to make management decisions under situations when VF(s) may be experiencing errors. Thus whenever the CMS is made aware of a VF undergoing congestion it will utilize Algorithm-1 for making management & orchestration decisions, while in case of errors it will utilize a method that has a been evaluated with a higher QoD.

In another example scenario, consider a target-VF that may be impacting on the performance of other VF(s) sharing the same host. In this case the CMS may have to decide whether to migrate/scale the target-VF or the impacted VF(s) to another available host system in the infrastructure. Whatever the action, the decision of the CMS will be evaluated and assigned a QoD value, which will be updated with time depending on the level of service stability achieved after the decision has been executed.

Thus, whenever a CMS executes a management decision, that decision will be evaluated, ranked and assigned a QoD value indicating how effective/rewarding the decision has been in terms of QoS and resource utilization. In other words, the CMS will undergo a learning process where each time it executes a management and orchestration action, it will be evaluated and assigned a QoD value. This QoD value will be regularly updated based on CMS further (in)actions, and it will be maintained inside a repository referred to as QoD Repository (QoD-R).

The QoD-R can be part of the CMS or it may be an external entity connected to the CMS via relevant interfaces. FIG. 2 shows QoD-R as part of the CMS where it is connected to the decision engine (DE)/orchestrator. The AE will derive and compare KPIs from the information provided by the monitoring system for each VF per host. The AE will notify the DE in the event the AE detects a non-conformance of one or more KPI for one or more CS. The DE upon receiving an event notification will look up the QoD-R for the presence of a similar event happening in the past. The event will be identified by the event_code key (see Table 1) where each event, such as congestion, link-failure, delays, CPU load increase, buffer full, packet loss etc., will have a unique code. It should be noted that the event notification received by the DE may also carry the identifier of the target VF(s) and their respective descriptor files (i.e., VFD). The DE will then attempt at tracing a VF that may be similar to the target VF or may belong to the same functional category as the target VF using the second key vf_pointer. The QoD-R will then enable the DE to find out about its past decision on action that it took for a similar event on a VF that may belong to the same category as the target-VF. The QoD value in the QoD-R enables the DE to judge the quality of its past decision. In case of a higher (or acceptable) QoD value the DE will invoke the same method (indicated by the method_id value) or by taking the same decision (indicated by the action_code value), and in case of a lower (or unacceptable) QoD value will derive a new LCM decision and create a new entry in the QoD-R under the event_code key. In case the DE finds multiple entries for VFs of the same functional category as the target VF then it will select the decisions for that VF entry that has the highest QoD value. Thus by consulting the QoD-R the DE decision process is not only expedited by avoiding the process of deriving a decision on action and computing resource requirements each time it receives a performance/fault notification but it will also most likely make the decision that yields the best result reflected by the QoD value for its past similar decision.

Figure 4:
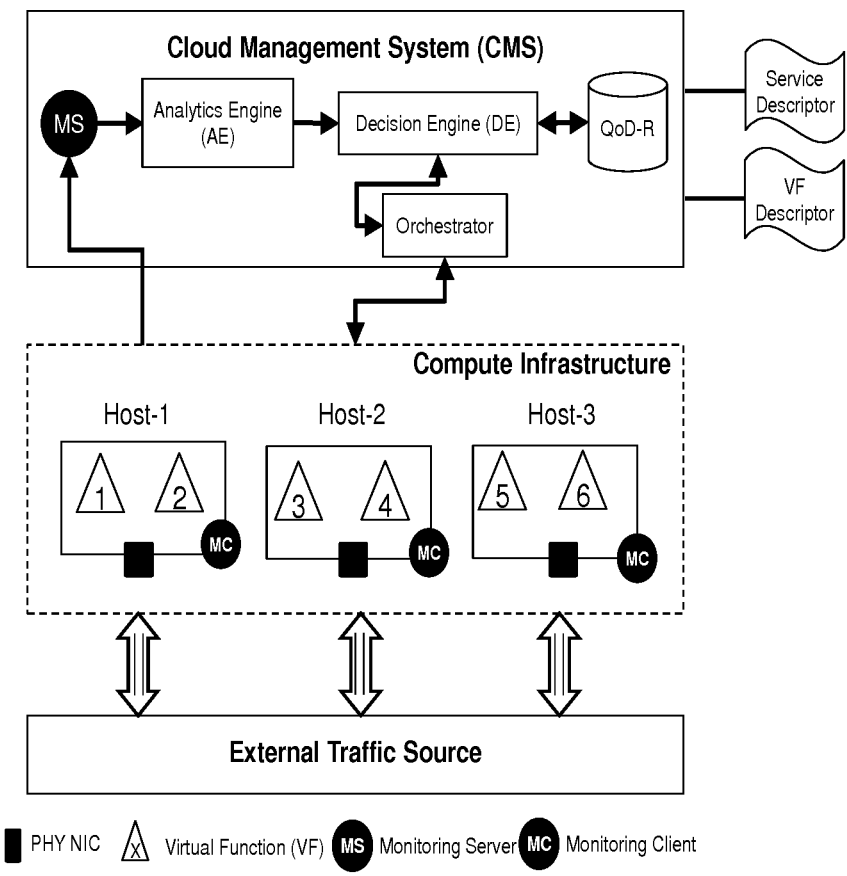
FIG. 4 shows part of steps of a method according to a further embodiment of the present invention.

FIG. 4 shows part of steps of a method according to a further embodiment of the present invention.

In FIG. 4 distributed monitoring for reducing the monitoring and processing load on the CMS is shown. The reduction in monitoring and processing load is achieved by enabling a monitoring client in each host system monitoring and analyzing the utilization of both physical and virtual resources at the host level. The monitoring client MC will then send an event notification to the monitoring server MS inside the CMS, or optionally external to it, which will forward it to the AE where the event notifications from different monitoring clients MC are analysed. Its analysis results are sent to the DE for consultation with the QoD-R in order to derive an optimum decision on management action.

The QoD-R thus enables the CMS to store, maintain and manage the QoD value for the various events on which the CMS took management and orchestration decisions.

Figure 5:
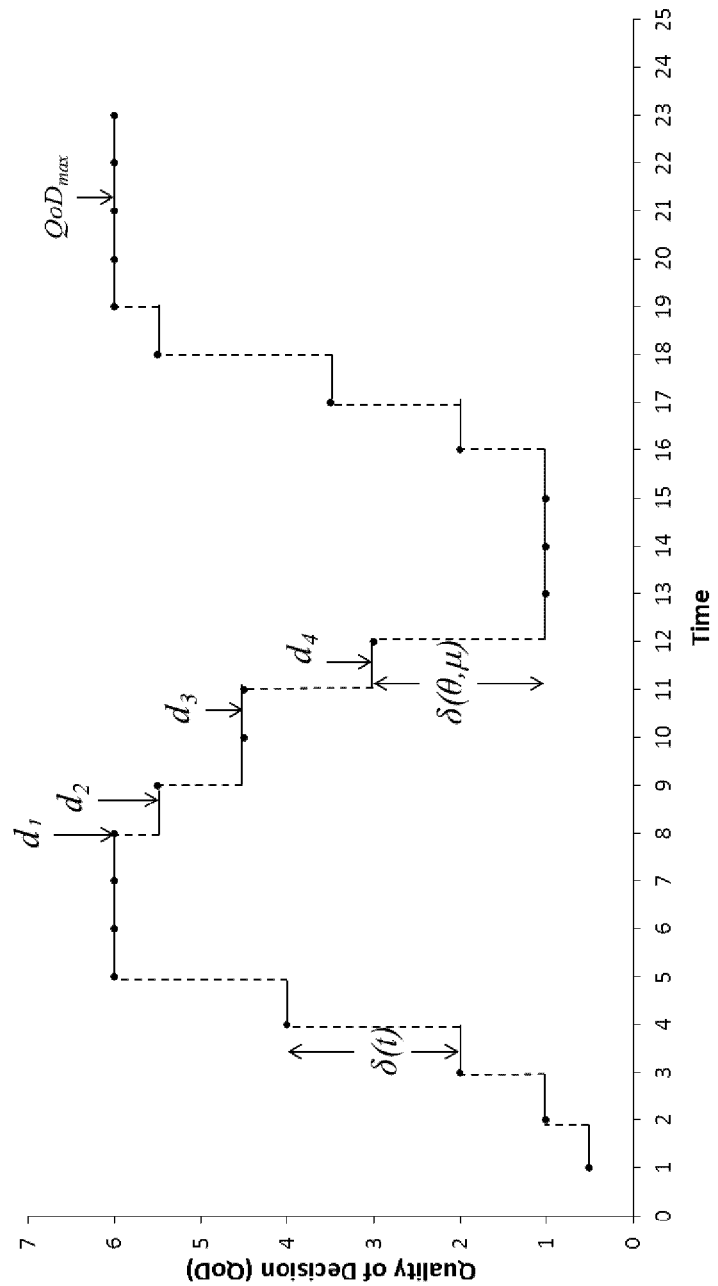
FIG. 5 shows part of steps of a method according to a further embodiment of the present invention.

FIG. 5 shows part of steps of a method according to a further embodiment of the present invention.

In FIG. 5 a step function indicating the variation in the QoD of a CMS for a specific network-service/virtual-function is shown. According to FIG. 5 the increment/decrement of the QoD value/score can be based on a step function where the size of each step can be either kept constant, or it can vary with each expiry of the QoD computation time. The QoD computation time can be a fixed time period at the expiry of which the QoD value is computed.

An illustrative example of this concept is shown in FIG. 5, while the different mathematical notations are defined in Table 2 below:

| Symbol | Description |
| --- | --- |
| $t_{eval}$ | Evaluation time which are discrete time steps at the expiry of which the QoD is evaluated |
| $t_{stable}$ | The time duration for which the NS instance remains stable and no management action has been performed on it by the CMS. It is the multiple of $t_{eval}$ |
| $\delta$ | Step size, indicating the increase/decrease in the QoD value |
| $\theta$ | Decision rate. The number of management decisions a CMS has to make per unit time. |
| $\mu$ | Mean resource utilization |
| $QoD_{max}$ | The maximum value of QoD. |
| n | Monitoring epoch, at the end of each epoch the monitoring system will send the monitored KPIs to the CMS' Analysis Engine (AE) for evaluation. |

As seen from FIG. 5 a step graph is depicting the changes in the QoD of a CMS for a particular NS/VF. At the time of NS initialization, a default QoD value is assigned to the NS instance, which in our example is 0.5. The QoD for the CMS is evaluated at the expiry of discrete time instants, which are referred to as evaluation time ($t_{eval}$). The evaluation of QoD is done by, at least, taking into account the decision rate ($\theta$) and the mean resource utilization ($\mu$) as depicted in example equation as shown above. If at the expiry of $t_{eval}$ the NS is stable and no management action is performed on it by the CMS then the QoD value shall be incremented, where the size of the increment is the step size ($\delta$) of the step function. In other words, no management action implies that the previous management decision has resulted in a stable service so far and thus the decision is rewarded by incrementing ($\delta$). The value of ($\delta$) can either be constant or it can be a function of time i.e., ($\delta(t)$) where the step-size will vary with time. To describe the notion of ($\delta(t)$) for instance the NS instance is assumed to stable for a duration of time ($t_{stable}$), where $t_{stable}=(t_{eval}/n)$ where n is the monitoring epoch at each instance of which the monitoring system will send its result to the CMS for evaluation. NS being stable means that no management action was applied on the NS implying the last management action to be optimum and robust. In such a situation with each expiry of $t_{eval}$, the step size will increment, however the size of the increment will be directly proportional to ($t_{stable}$) as long as the CMS does not perform any management action on the NS instance. Thus the longer a NS remains stable the more rewarding it would be indicating successive stability of the CMS previous LCM decision and action, and the QoD value will thus increase much faster till reaches a specified maximum value ($QoD_{max}$). In the present illustrative example, $QoD_{max}=6$.

A numerical example of the output is depicted in FIG. 5, where $QoD_{max}=6$, $t_{eval}=1.0$ and for simplicity n=1. Assuming that the NS remains stable and no management decision/action is required till $t_{eval}=8.0$. Thus at the expiry of every epoch of $t_{eval}$ the QoD value will be incremented. The size of the each successive increment will be greater than the size of the previous increment as long as there is no LCM decision/action taken. For example, at $t_{eval}=2.0$ the step size $\delta(t)$ will increases by 0.5 from its previous value of 0.5, and thus the QoD value will be 1.0. At $t_{eval}=3.0$ since the NS remains stable $\delta(t)$ now increases by 1.0 and the overall value of QoD=2.0. Then at $t_{eval}=4$ the step size is doubled (i.e., $\delta(t)=2$) from the previous value and the CMS computes QoD=4 indicating the persistent stability of the NS due to the CMS last executed LCM action. However, at $t_{eval}=5$ the step size cannot increase beyond $\delta(t)=2$ because it reaches the maximum QoD threshold, i.e., $QoD_{max}=6.0$. The QoD value will remain constant at $QoD_{max}$ for as long as the NS remains stable. However, when the CMS performs the LCM action on the NS, then its QoD value may be re-evaluated at the next instance of $t_{eval}$ and thus the step size may be decremented. For example, as indicated in FIG. 5, when the CMS performs a LCM action ($d_1$) on the NS (e.g., a NS instance scale-out or a migration), the QoD value is decremented by δ(t)=−0.5. As before, the step size δ(t) may depend on how unstable the NS has become as a result of the management action by the CMS. As before the step size δ(t) may be directly proportional to the decision rate. For instance by the next epoch of $t_{eval}$=8.0 when the CMS makes yet a second decision (d$_2$) then δ(t)=−1.0 and QoD will decrement to 4.5 from 5.5, and so on. The decrement of step size can additionally or alternatively be made a function of mean resource utilization (μ) i.e., δ(θ, μ) where it may takes into account the amount of resources being utilized as a result of the management action.

As implied the step size δ(t) increase or decrease can be considered as a reward/penalty of the pervious LCM action, i.e. rewards follow stability, i.e. long periods of timespans without actions, while "penalties" follow converse scenarios. Hence, successive increases in the QoD value will occur as long as the NS remains stable, while it will suffer an opposite effect for as long as the NS is showing performance instability and is subjected to successive LCM actions. In addition, the impact or magnitude of reward/penalty can be determined by the time dependent weight function w(t) where, for example, the QoD value is computed with a higher weight function during busy hours than during low utilization periods when enough resources are available.

Figure 6:
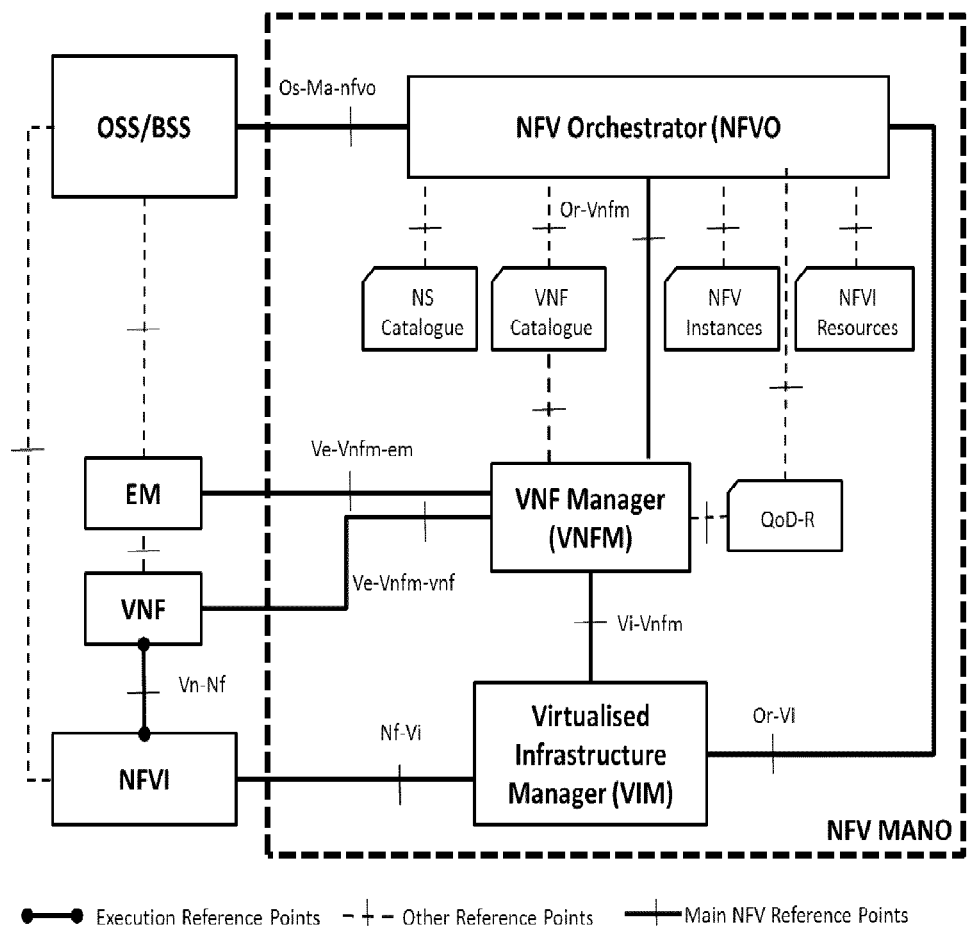
FIG. 6 shows a system according to a further embodiment of the present invention.

FIG. 6 shows a system according to a further embodiment of the present invention.

In FIG. 6 a QoD-R as a shared repository between the NFVO and VNFM of the European Telecommunication Standards Institute (ETSI) NFV MANO framework is shown. With reference to the ETSI NFV Management and Orchestration MANO framework, the QoD-R can be a shared repository between the NFVO and the VNFM as illustrated in FIG. 6. In the context of ETSI NFV system, the CS is referred to as a Network Service (NS), a VF is referred to as a Virtualized Network Function (VNF) and a VFC referred to as VNF Component (VNFC). A NS can be composed of different VNFs chained together via virtual links in a specific order as per service requirements. The NS can also be a composed of a single more complex VNF where the VNF is composed of several VNFCs interconnected in a specific order. Besides Resource Orchestration between multiple NFV infrastructures (i.e. datacenters), the MANO's NFVO functional block is also responsible for the lifecycle management LCM of the NS. The VNFM on the other hand is responsible for the lifecycle management of the VNF instances. The NFV Infrastructure (NFVI) is a DC that provides the physical and virtual resource on which to deploy the VNFs. The NFVO and VNFM manage the resources via the Virtualized Infrastructure Manager (VIM).

Both the NFVO and the VNFM can thus utilize the QoD-R for efficient lifecycle management of the NS and/or the VNF instance(s). The NFVO, VNFM and VIM interact with each other in order to manage and orchestrate the virtual resources and services. The VIM is monitoring the resource utilization of the respective VNFs whereas the VNF itself is providing performance related information to the VNFM. The resource and performance information is provided to the NFVO via the Or-VNFM and Or-Vi reference points and based on the prevalent situation the NFVO will manage the NS lifecycle.

The VNFM also manages the lifecycle of the individual VNFs under its functional domain. The NFVO/VNFM, upon detecting performance/reliability/resource issues notified via the Performance Management (PM)/Fault Management (FM) interfaces defined on the respective reference points can refer to the QoD-R as described previously for making efficient management decisions. For this purpose the NFVO and VNFM can interface with the QoD-R as depicted in FIG. 6. As mentioned earlier, the efficiency is in terms of reduced time in making effective decisions on management and orchestration actions by the NFVO/VNFM. The information maintained in the QoD-R can enable the NFVO/VNFM to make LCM decisions by taking into account a single QoD metric that is updated regularly in the QoD-R. As another embodiment, the QoD-R can also be part of the existing NFV MANO repositories.

Figure 7:
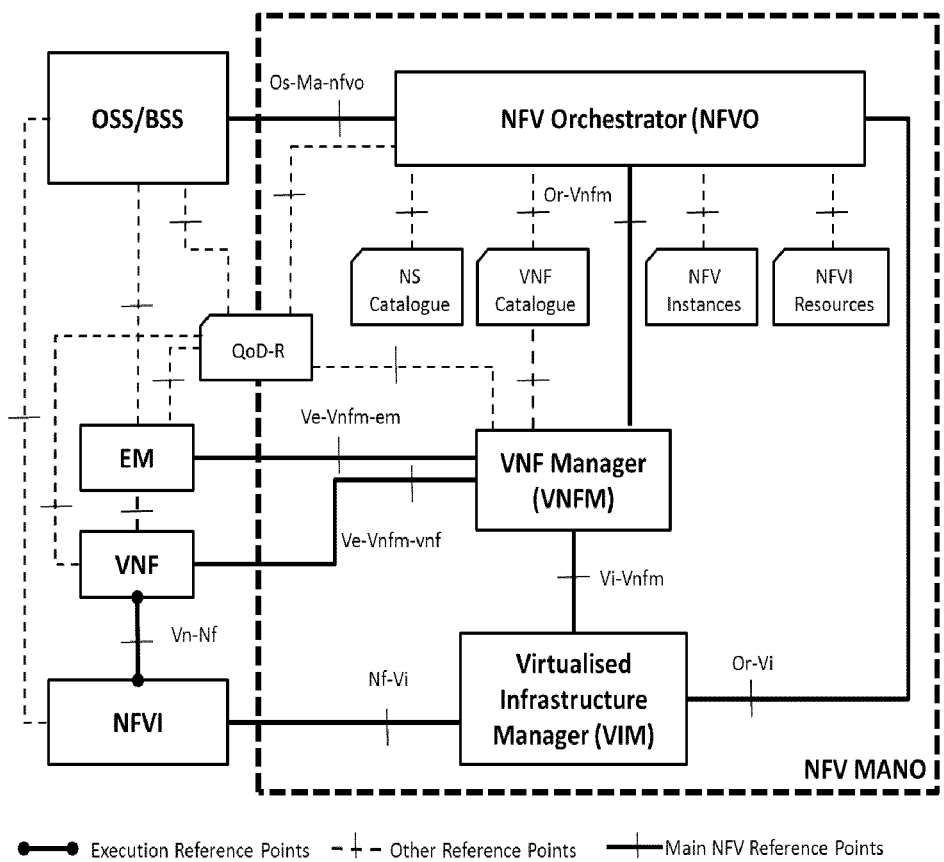
FIG. 7 shows a system according to a further embodiment of the present invention.

FIG. 7 shows a system according to a further embodiment of the present invention.

In FIG. 7 the QoD-R as a shared repository between external entities and the ETSI NFV MANO framework is shown. The NFVO/VNFM may also receive event notifications from different elements that may also lie outside the MANO framework (such as OSS/BSS, EM, VNF), thus the QoD-R can also be shared between these different elements as illustrated in FIG. 7.

According to ETSI-MANO, ETSI GS NFV-MAN 001 V1.1.1, "Network Functions Virtualisation (NFV); Management and Orchestration", December 2014, the external entities like OSS/BSS and Element Manager (EM), or even in some cases the VNF can not only monitor data but also derive management actions and then send the recommended decision on action to the NFVO or the VNFM for resource orchestration and execution. To make optimized decisions based on QoD values these external entities have access to the QoD-R. For example, the EM can detect performance/reliability issue within one of its VNF and utilizing the information inside the QoD-R (as described previously) can derive a management decision. It can then involve NFVO to validate its decision and thus execute it. In this way the NFVO's management tasks can be distributed thus making the system more robust and scalable.

For security reason, the access to the QoD-R by the NFV MANO external entities (i.e., OSS/BSS, EM) can be limited to only those VNFs and or network services that are part of their functional/operational/administrative domain. In other words, the EM can only have access to those entries within the QoD-R that are related to only those VNFs that are being managed by the respective EM and/or OSS/BSS. The access to select VNFs can be resolved based on the VNF Id. Since the external entities have limited access to QoD-R, the NFVO can also in-validate the management decision derived by the EM and/or OSS/BSS. This will be in situation when the NS is composed on VNFs that may belong to different EMs. Hence the decision made by the EM for a particular VNF may not be optimum from the overall NS perspective.

In a further embodiment the present invention provides a monitoring system configured to monitor and report the utilization of specified resources (e.g., compute, network, memory, storage) and/or performance metrics of the VFs and of the host system itself, wherein an Analysis Engine has the functionality to compute and derive KPIs from the resource utilization metrics reported by the monitoring system and wherein a decision engine has the function of comparing and analyzing the derived/computed KPIs with reference to service policies in order to derive necessary and appropriate management actions and wherein maintenance of the QoD-R is used by the Decision Engine to derive the optimum management decisions.

In summary the present invention provides a method and a system enhancing the performance of a cloud management system CMS by reducing the monitoring and processing load, and for optimizing its management and orchestration decisions by taking into account a single metric, referred to as Quality of Decision QoD, wherein the quality of the management and orchestration decision is quantified by said performance parameter referred to as QoD, which is in particular a function of decision rate and resource utilization and wherein the CMS may maintain a QoD repository QoD-R that tracks and maintains the quality of the management decision made by the CMS on NS/VF instance(s). Further a NFV MANO framework can be extended by providing the relevant functional blocks with an interface to the QoD-R.

In summary at least one embodiment of the present invention may have at least one of the following advantages.
1. Enable the CMS to select the best possible method and/or decision on management/orchestration action.
2. Enables the CMS to make optimum management decisions and orchestration actions with less iteration.
3. Reduce the time it takes for the CMS to make the decision on actions.
4. Reduce the time it will take for the affected services to become stable as fewer management iterations will be required.
5. Reduce the monitoring and processing load on the CMS by enabling it to avoid the repeated monitoring of individual resource units per VF or VFC and then processing it each time to derive a management and orchestration action.
   a. The monitoring and processing load is further reduced if the event sensing and identification is done by each VF and/or each host system and then only event notifications are sent to the CMS to make decisions.
   b. The processing load on the NFVO is further reduced by providing relevant external management entities like EM and OSS/BSS limited access to the QoD-R.
6. Enable the services to stabilize quickly with optimum service and resource utilization.

Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for managing computational resources of a data center, the method comprising:
   assigning one or more computational resources of the data center to one or more physical and/or virtual functions by one or more management decisions (MDs) determined by a decision making entity (DME);
   computing at least two single performance metrics (SPMs) using at least two different algorithms, wherein the at least two SPMs represent performance and efficiency of the DME using a result of an analysis of collected performance information for the one or more MDs, wherein computing the at least two SPMs is based on a rate of the one or more MDs and an average resources utilization of the one or more MDs, and wherein the rate of the one or more MDs is a number of the one or more MDs that are determined by the DME over a period of time; and
   using, by the DME, a greatest value SPM of the at least two computed SPMs for determining one or more further MDs.

2. The method according to claim 1, wherein the rate of the one or more MDs and the average resources utilization are metrics for the one or more virtual functions, and wherein computing the at least two SPMs is further based on a time-dependent weight function.

3. The method according to claim 1, wherein the one or more MDs and the one or more further MDs are determined based on receiving one or more notifications of events that are providable by an external management system and/or by observations of one or more computing entities of the data center.

4. The method according to claim 1, wherein the at least two SPMs are evaluated and are updated periodically irrespective of whether at least one of the one or more further MDs has been determined or not.

5. The method according to claim 1, wherein a SPM of the at least two SPMs and a corresponding management decision are stored in a storage entity, and wherein when an event occurs, the stored SPM and the corresponding management decision are checked to determine whether the stored management decision is executable in view of the occurred event, wherein the stored SPM and the corresponding management decision are storable in a multi-map based data structure.

6. The method according to claim 5, wherein the SPM and the corresponding management decision are computed event-based, and wherein the SPM and the corresponding management decision are stored together with event information.

7. The method according to claim 5, wherein information stored on the storage entity is shared between a plurality of different virtual and/or physical instantiated resources of the data center.

8. The method according to claim 1, wherein resources of data center monitor information comprises at least one of: performance information of the data center and an occurring event on the one or more computational resources, and wherein the data center monitor information is transmitted to an analyzing entity, which upon analysis transmits an analysis result to the DME for determining the one or more further MDs.

9. The method according to claim 1, wherein a SPM of the at least two SPMs is decreased or increased in predefined steps after expiry of a certain time period.

10. The method according to claim 9, wherein a size of the predefined steps is time-dependent, and is adaptable based on a time for computing the SPM.

11. The method according to claim 9, wherein the SPM is increased when no MD have been determined during the certain time period, and wherein the SPM is decreased when the one or more further MDs has been determined during the certain time period.

12. The method according to claim 1, further comprising:
updating a SPM of the at least two SPMs based on a certain time period expiring, wherein updating the SPM comprises incrementing or decrementing the SPM based on the certain time period expiring and whether the one or more physical and/or virtual functions are stable.

13. The method of claim 12, further comprising:
determining the one or more physical and/or virtual functions are stable based on not performing the one or more further MDs during the certain time period, and wherein updating the SPM comprises incrementing the SPM based on the certain time period expiring and determining the one or more physical and/or virtual functions are stable.

14. The method of claim 12, further comprising:
determining the one or more physical and/or virtual functions are not stable based on re-assigning the one or more computational resources of the data center to the one or more physical and/or virtual functions based on the one or more further MDs, and
wherein updating the SPM comprises decrementing the SPM based on determining the one or more physical and/or virtual functions are not stable.

15. The method of claim 1, further comprising:
updating a SPM of the at least two SPMs by incrementing or decrementing the SPM based on whether the one or more physical and/or virtual functions are stable over a plurality of time intervals, wherein the SPM is incremented or decremented by a greater step value based on the one or more physical and/or virtual functions being consistently stable or consistently not being stable over subsequent time intervals from the plurality of time intervals.

16. A data center comprising:
one or more managing entities and a decision making entity (DME), the one or more managing entities comprising one or more hardware processors being configured, alone or in combination, to provide for execution of the following steps:
assign one or more computational resources of the data center to one or more physical and/or virtual functions by one or more management decisions (MDs) determined by the DME;
compute at least two single performance metrics (SPMs) using at least two different algorithms, wherein the at least two SPMs represent performance and efficiency of the DME using a result of an analysis of collected performance information for the one or more MDs, wherein computing the at least two SPMs is based on a rate of the one or more MDs and an average resources utilization, and wherein the rate of the one or more MDs is a number of the one or more MDs that are determined by the DME over a period of time; and
use a greatest value SPM of the at least two computed SPMs to determine one or more further MDs.

17. A computing entity comprising one or more hardware processors which, alone or in combination are configured to provide for execution of the following steps:
determine one or more management decisions (MDs) for assigning one or more computational resources of a data center to one or more physical and/or virtual functions;
compute at least two single performance metrics (SPMs) using at least two different algorithms, wherein the at least two SPMs represent performance and efficiency of the one or more MDs of the computing entity, wherein computing the at least two SPMs is based on a rate of the one or more MDs and an average resources utilization, and wherein the rate of the one or more MDs is a number of the one or more MDs that are determined over a period of time; and
use a greatest value SPM of the at least two computed SPMs to determine one or more further MDs.

18. A tangible, non-transitory computer readable medium storing a program causing a computer to execute a method for managing computational resources of a data center comprising:
assigning one or more computational resources of the data center to one or more physical and/or virtual functions by one or more management decisions (MDs) determined by a decision making entity (DME);
computing at least two single performance metrics (SPMs) using at least two different algorithms, wherein the at least two SPMs represent performance and efficiency of the DME using a result of the analysis, wherein computing the at least two SPMs is based on a rate of the one or more MDs and an average resources utilization, and wherein the rate of the one or more MDs is a number of the one or more MDs that are determined by the DME over a period of time; and
using, by the DME, a greatest value SPM of the at least two SPMs to determine one or more further MDs.

* * * * *